United States Patent
Yauk et al.

(10) Patent No.: US 9,550,622 B2
(45) Date of Patent: Jan. 24, 2017

(54) CONTAINERS

(71) Applicant: Kraft Foods R&D, Inc., Deerfield, IL (US)

(72) Inventors: Kate Avrial Yauk, Zurich (CH); Jo-Ann Clark, Inverness Shire (GB); Ayse Tulay Massey, Banbury (GB); Sian Henson, Conventry (GB); Leonard S. Scarola, Cary, NC (US)

(73) Assignee: Kraft Foods R&D, Inc., Deerfield, IL (US)

( * ) Notice: Subject to any disclaimer, the term of this patent is extended or adjusted under 35 U.S.C. 154(b) by 254 days.

(21) Appl. No.: 14/540,899

(22) Filed: Nov. 13, 2014

(65) Prior Publication Data

US 2015/0104547 A1 Apr. 16, 2015

Related U.S. Application Data

(63) Continuation of application No. 13/811,239, filed as application No. PCT/US2011/044491 on Jul. 19, 2011, now Pat. No. 8,920,858.

(30) Foreign Application Priority Data

Jul. 19, 2010 (GB) .................................. 1012106.9

(51) Int. Cl.
*B65D 85/73* (2006.01)
*A23L 2/40* (2006.01)
(Continued)

(52) U.S. Cl.
CPC ................. *B65D 85/73* (2013.01); *A23L 2/40* (2013.01); *B65D 75/5866* (2013.01);
(Continued)

(58) Field of Classification Search
CPC . B65D 85/73; B65D 75/5866; B65D 81/2023; B65D 82/3272; B65D 85/80; B65D 2205/025; B65D 81/3266; A23L 2/40
See application file for complete search history.

(56) References Cited

U.S. PATENT DOCUMENTS 2,899,318 A 8/1959 Long
2,932,385 A 4/1960 Bollmeier et al.
(Continued)

FOREIGN PATENT DOCUMENTS

CN 1729130 A 2/2006
CN 101355882 A 1/2009
(Continued)

OTHER PUBLICATIONS

Japanese Patent Office, Office Action mailed Jan. 5, 2016, from corresponding Japanese Patent Application 2013-520799, 3 pages.
(Continued)

*Primary Examiner* — Chaim Smith
(74) *Attorney, Agent, or Firm* — Fitch, Even, Tabin & Flannery LLP

(57) ABSTRACT

Improvements in containers are provided, and in particular improvements in containers for preparing and dispensing foamable beverage and food products. The package may contain at least a liquid primary ingredient and a secondary ingredient and comprises at least one wall defining a chamber at least partially filled with the primary ingredient, an outlet for dispensing the prepared product, and a capsule surrounding the primary ingredient separating the secondary ingredient from the primary ingredient. The capsule may be attached to insides of opposing walls of the package such that as the opposing walls are moved further apart the capsule breaks. At least one of the ingredients may include a foaming agent such that the foamed product is produced when the capsule is broken and the primary and secondary ingredients mix.

14 Claims, 8 Drawing Sheets

(51) Int. Cl.
  *B65D 75/58*  (2006.01)
  *B65D 81/20*  (2006.01)
  *B65D 81/32*  (2006.01)
  *B65D 85/80*  (2006.01)

(52) U.S. Cl.
  CPC ..... *B65D 81/2023* (2013.01); *B65D 81/3266* (2013.01); *B65D 81/3272* (2013.01); *B65D 85/80* (2013.01); *A23V 2002/00* (2013.01); *B65D 2205/025* (2013.01)

(56) References Cited

U.S. PATENT DOCUMENTS

| | | | |
|---|---|---|---|
| 3,638,786 | A | 2/1972 | Borecki et al. |
| 4,057,047 | A | 11/1977 | Gossett |
| 4,596,713 | A | 6/1986 | Burdette |
| 5,079,013 | A | 1/1992 | Belanger |
| 5,396,934 | A | 3/1995 | Moench |
| 5,628,404 | A | 5/1997 | Hendrix |
| 6,023,915 | A | 2/2000 | Colombo |
| 6,866,145 | B2 | 3/2005 | Richards et al. |
| 7,055,683 | B2 | 6/2006 | Bourque et al. |
| 8,920,858 | B2 | 12/2014 | Yauk et al. |
| 2004/0004087 | A1 | 1/2004 | Iwamoto et al. |
| 2005/0112262 | A1 | 5/2005 | In Albon |
| 2006/0040038 | A1 | 2/2006 | Zeller et al. |
| 2007/0031545 | A1 | 2/2007 | Ejisackers et al. |
| 2007/0240582 | A1 | 10/2007 | Eimer et al. |
| 2008/0066623 | A1 | 3/2008 | Noordhuis |
| 2009/0110786 | A1 | 4/2009 | Wells |
| 2011/0008514 | A1 | 1/2011 | Spelman et al. |

FOREIGN PATENT DOCUMENTS

| | | |
|---|---|---|
| DE | 4332387 | 3/1995 |
| DE | 19612965 | 10/1997 |
| EP | 1319357 | 6/2003 |
| EP | 1362799 A1 | 11/2003 |
| EP | 1498059 | 1/2005 |
| EP | 1627568 | 2/2006 |
| EP | 1627572 | 2/2006 |
| EP | 1797772 | 6/2007 |
| GB | 2013619 | 8/1979 |
| GB | 2298180 A | 8/1996 |
| JP | 53-119270 | 9/1978 |
| JP | 57-3666 | 1/1982 |
| JP | 01-238812 | 9/1989 |
| JP | 3-16884 | 2/1991 |
| JP | 673266 U | 11/1994 |
| JP | H09501130 | 2/1997 |
| JP | 2004-161381 | 6/2004 |
| JP | 2006511409 | 4/2006 |
| JP | 2007-210683 | 8/2007 |
| JP | 2009523104 | 6/2009 |
| KR | 20090043649 A | 5/2009 |
| WO | 199509118 | 6/1995 |
| WO | 2005115871 A1 | 12/2005 |
| WO | 2009039036 | 3/2009 |

OTHER PUBLICATIONS

United Kingdom Intellectual Property Office, Combined Search and Examination Report dated Nov. 1, 2010, from Great Britain Application GB1012104,4, 7 pages.
International Search Report and Written Opinion for PCT/US2011/044491 issued Oct. 5, 2011.
United Kingdom Intellectual Property office, Combined Search and Examination Report dated Nov. 1, 2010, from corresponding United Kingdom Patent Application No. 1012106.9, 7 pages.
Response to Combined Search and Examination Report dated Apr. 26, 2011, from corresponding United Kingdom Patent Application No. 1012106.9, 2 pages.
International Preliminary Report on Patentability dated Jan. 22, 2013 from corresponding PCT/US2011/044491, 5 pages.
Japanese Patent Office, Office Action dated Mar. 3, 2015, from corresponding Japanese Patent Application 2013-520799, 2 pages.
State Intellecutal Property Office, P.R. China, First Office Action issued Oct. 8, 2013, from corresponding China Patent Application No. 201180044813.5, 10 pages.
State Intellectual Property Office, P.R. China, Second Office Action issued Jun. 17, 2014, from corresponding China Patent Application No. 201180044813.5, 8 pages.
United Kingdom Intellectual Property Office, Office Action issued May 2, 2012, from corresponding United Kingdom Patent Application No. 1012106.9, 3 pages.

CONTAINERS

CROSS-REFERENCE TO RELATED APPLICATIONS

This application is a continuation of U.S. patent application Ser. No. 13/811,239, filed Jan. 18, 2013, which is a U.S. national phase application of International Application No. PCT/US2011/044491, filed Jul. 19, 2011, designating the United States, which claims benefit from Great Britain Patent Application No. GB 1012106.9, filed Jul. 19, 2010, all of which are hereby incorporated herein by reference in their entireties.

FIELD

The invention relates to improvements in containers, and in particular to improvements in containers for preparing and dispensing foamable beverage and food products.

BACKGROUND

Over the past few decades, there has been an erosion of traditional eating habits and this has led to a growth in the snack food market. Snacks are no longer confined to grazing between meals, but also are taking the place of meals, for example, as workers eat lunch at their desks.

Whilst consumers are demanding products which may be indulgent, more affordable, playful or overall more interesting, the success of any snack product is still highly dependent on its convenience.

Alongside the development of snack food products, there is a greater demand for a greater range of beverages and in particular there has been a rapid rise in packaged coffee products which have developed from a basic drink to a wide range of drinks designed to appeal to different consumer tastes. In particular some of these drinks use premium coffees, which are leading to the development of indulgent treats in the form of foamed food and beverage products.

One process for serving a ready-to-drink cappuccino is described in DE-A-4332387. This describes an extraction method using coffee powder which is mixed with liquid and stored in a container with an air space of a quarter to a twentieth of the container volume. Prior to opening and consumption, the containers are shaken until foam has formed in the air space. The container is then opened and the beverage drunk from the container or emptied into a separate drinking receptacle.

The Douwe Egberts Café Switch™ product launched in 2006 is described in US-A-2007/0031545 and comprises a package which can be used for preparing a coffee beverage from a foamable liquid and a gas. The package comprises two chambers which are connected, between which the liquid and gas are displaceable by squeezing each chamber consecutively. A flow disrupter placed in the connecting passage assists the mixing and foam formation. After pumping the package can be opened and the contents poured into a drinking vessel and topped up with hot or cold water.

Both of these prior art solutions, however, require rigorous shaking or some form of manual manipulation. It is therefore desirable to provide an improved package for preparing a foamable beverage or food product.

SUMMARY

Accordingly there is provided a package for the preparation of a foamed beverage or food product containing at least a liquid primary ingredient and a secondary ingredient, said package comprising at least one wall defining a chamber at least partially filled with the primary ingredient, an outlet for dispensing the prepared product, and a breakable barrier separating the secondary ingredient from the primary ingredient, wherein at least one of the ingredients includes a foaming agent such that the foamed product is produced when the breakable barrier is broken and the primary and secondary ingredients mix.

Preferably the breakable barrier is a capsule surrounding the primary ingredient.

The capsule is preferably attached to insides of opposing walls of the package such that as the opposing walls are moved further apart the capsule breaks.

Preferably the package is resiliently deformable between the normal expanded position and a compressed position, the movement from the compressed position to the expanded position being such that it breaks the capsule.

Preferably the application of manual pressure breaks the breakable barrier.

The package preferably further comprises means for selectively opening and closing the outlet.

The package preferably also comprises air inlet means for selectively enabling the ingress of air into the chamber, which may be a one way valve in the at least one wall or a plurality of apertures in the at least one wall of a size which allows the ingress of air into the chamber but substantially prevents the egress of liquid from the chamber.

The outlet may provide the air inlet means.

The outlet is preferably formed by tearing a portion of the package along a line of weakening.

The outlet may comprise a nozzle or a path, the construction of which aids generation of foam.

Means are preferably provided for rupturing the barrier such as an activatable lever.

Preferably the barrier is located in a nozzle at the outlet.

There is also provided a method of preparing a foamed beverage or food product from a liquid primary ingredient and a secondary ingredient from a package as claimed in any one of the preceding claims, comprising the steps of breaking the barrier separating the secondary ingredient from the primary ingredient to enable the primary and secondary ingredients to mix and foam, opening the outlet and squeezing the package to dispense the prepared product via the outlet.

The packages can be used to prepare a finished foamed product, such as a frothy milk shake. Alternatively they can be used to prepare a foamed product, such as foamed milk, which may be mixed with another ingredient or another beverage, such as coffee, to create a cappuccino. In particular it is envisaged that these packages may be used to replace the currently used coffee mix and soft pod powder adjunct which contains powdered creamer and a foam booster ingredient. Typically a roast and ground (R & G) coffee or a liquid coffee solution made from a small sachet of soluble coffee will be poured onto this to provide a coffee beverage with a white foam. The packages described herein allow a liquid concentrated milk/creamer to be used to provide the milkiness and the foam.

In another application the package contains a milk/creamer which replaces the two step pod approach (i.e. a creamer pod and an R&G pod) which are separately prepared and then combined to provide the white foam on the coffee. Using the new package, only one brewing step is required (e.g. just the coffee) and the foamed milk may be added directly to the coffee or vice versa.

Using the packages described herein it is easy to produce a final drink of approximately 300 ml, of which 50 ml is foam, 50 ml is coffee and 200 ml is milk.

The foam produced may be aerated foam or a mousse similar to those that can be dispensed from a can for desserts. The latter may be used in combination with espresso to create an espresso macchiato drink. For this type of drink one might produce 50 ml of concentrated creamer (2-4 times concentrated) which is foamed with minimal dilution and added on top of a separately brewed espresso.

Another suitable application is for producing foamed chocolate (white, milk or dark chocolate) which may be used on top of an espresso or a cappuccino, or just diluted to create a foaming hot chocolate beverage. A suitable recipe for the former would be 100 ml of coffee plus 20 g of foamed dark chocolate paste or 25 g of milk chocolate paste. Another would be 200 ml coffee plus 20 g of foamed dark chocolate paste or 25 g of foamed milk chocolate paste.

In one form, a package is provided for the preparation of a foamed beverage or food product containing at least a liquid primary ingredient and a secondary ingredient, said package comprising at least one wall defining a chamber at least partially filled with the primary ingredient, an outlet for dispensing the prepared product, a breakable barrier separating the secondary ingredient from the primary ingredient, and a one way valve in the at least one wall enabling the ingress of air into the chamber wherein at least one of the ingredients includes a foaming agent such that the foamed product is produced when the breakable barrier is broken and the primary and secondary ingredients mix. The package may include means for selectively opening and closing the outlet. Further, the outlet may be formed by tearing a portion of the package along a line of weakening, and the outlet may comprise may comprise a nozzle. In addition, the outlet may provide a path, the construction of which aids generation of foam.

BRIEF DESCRIPTION OF THE DRAWINGS

The packages will now be described, by way of example only, with reference to the accompanying drawings, in which:—

DETAILED DESCRIPTION

Figure 1:
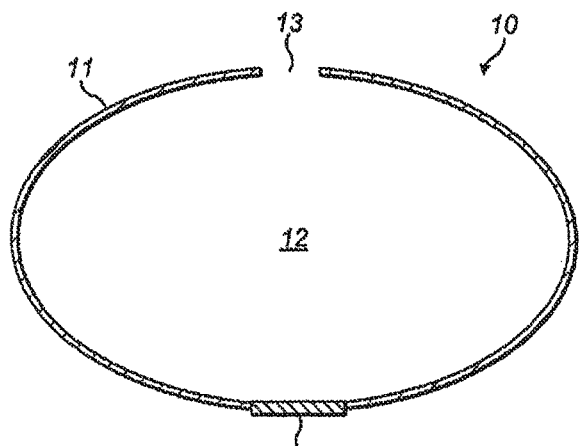
FIG. 1 is a cross sectional side elevation of a first package prior to filling.
Figure 2:
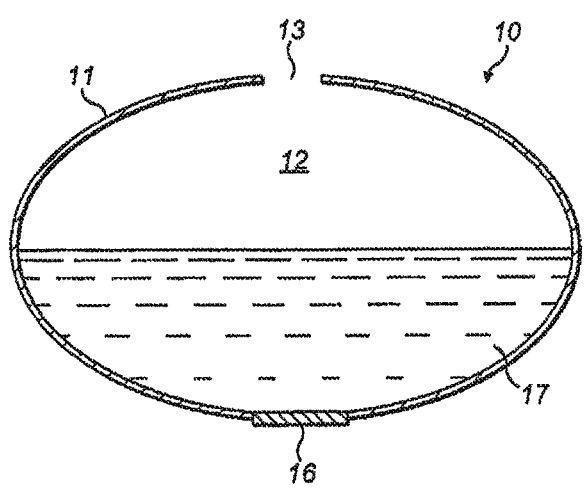
FIG. 2 is a cross sectional side elevation of the package of FIG. 1 filled with a product.
Figure 3:
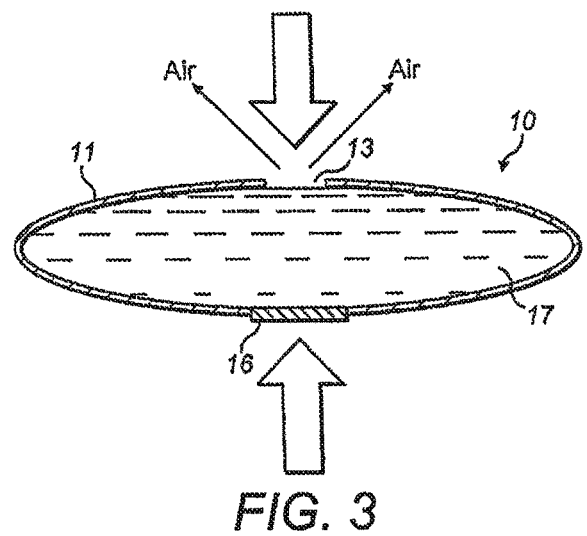
FIG. 3 is a cross sectional side elevation of the package of FIG. 1 with the air evacuated.

The packages described below enable a foamed (frothy) food or beverage product to be prepared by mixing a primary ingredient, which is in liquid form, with a secondary ingredient, which may be air, a gas, a powder containing air or gas, or another liquid. It should be noted that, in the context of this specification the reference to "ingredient" may refer to a composition of formed from a plurality of ingredients. The primary and secondary ingredients are separated until the preparation process commences. This can be achieved in a number of ways.

The primary ingredient may be a liquid coffee solution, concentrated liquid milk or creamer, a flavoured milk and chocolate (white, milk or dark). Although it is intended that the package effects the foaming of a foamable primary ingredient, the primary ingredient may also contain a foaming agent. Alternatively the secondary ingredient may include a foaming agent. The foaming agent may be one of those described in US-A-2006/0040038, EP-A-1627572 and EP-A-1627568 or any other suitable agent.

One package 10, illustrated in FIGS. 1 to 7, is a deformable package which is filled with the primary ingredient. The secondary ingredient is air, which is drawn into the package 10 upon opening.

The package 10 is preferably made from a semi-rigid liquid impermeable material, for example high density polyethylene, polypropylene, polystyrene, polyester, or a laminate of two or more of these materials. The addition of a layer of ethylene-vinyl alcohol polymer is desirable as it renders the package 10 fully gas impermeable. The preferred thickness of the walls lies in the range of 50 to 300 microns. The material, shape and makeup of the package 10, however, must be selected so that the package 10 is resiliently deformable when pressure is applied, but which will return to its original shape configuration when the pressure is removed. A convenient shape for the package 10 is a sphere or a compressed sphere.

The package 10 may be opaque, transparent or translucent and a suitable manufacturing process is injection moulding.

The walls 11 of the package 10 define a mixing chamber 12. It should be noted that the reference to "walls" herein should be considered to incorporate a single continuous wall or multiple walls depending on the design of the package 10. The walls 11 include an outlet 13 which is preferably selectively opened and closed by sealing means 14. The outlet 13 may be a simple orifice or a nozzle and the sealing means 14 may be a screw on cap, stopper, peelable adhesive foil or label or other suitable means depending on the nature of the outlet 13. Air inlet means 15, preferably in the form of a one-way valve, are provided in one of the walls 11, preferably at a distance from the outlet 13, for selectively allowing the ingress of air into the chamber 12. A removable cover 16 may be used to seal the air inlet means 15, which is removed when the product is to be prepared. The removable cover 16 may also be a peelable adhesive foil or label.

Figure 4:
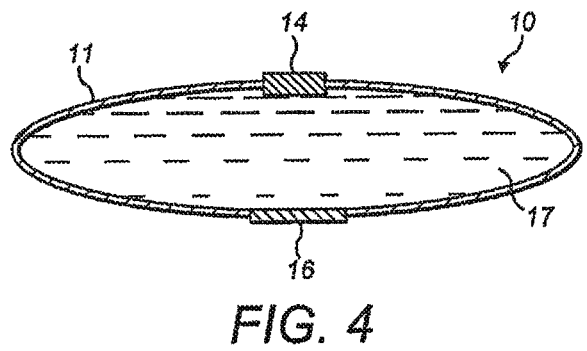
FIG. 4 is a cross sectional side elevation of a filled and sealed package.

Prior to filling the empty package retains a normal expanded shape and configuration, as shown in FIG. 1, and is filled with air. The chamber 12 is partially filled with the primary ingredient 17 via outlet 13 (FIG. 2) and air escapes via the outlet 13. The package 10 is compressed to evacuate any remaining air via the outlet 13 and, when all the air has been evacuated, the outlet 13 is sealed with the sealing means 14 (FIG. 4).

Figure 5:
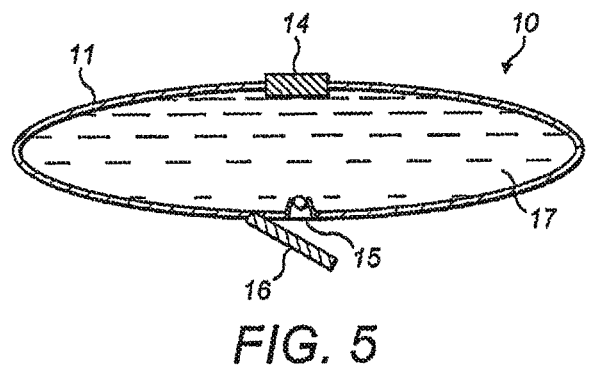
FIG. 5 is a cross sectional side elevation of the filled package of FIG. 4, showing the opening of the inlet valve.
Figure 6:
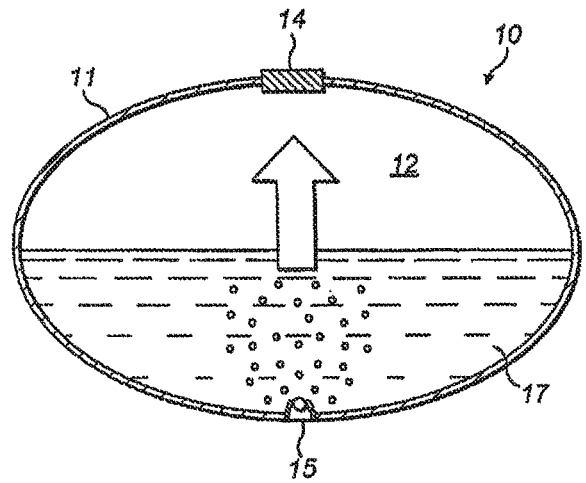
FIG. 6 is a cross sectional side elevation of the package with gas inducted.
Figure 7:
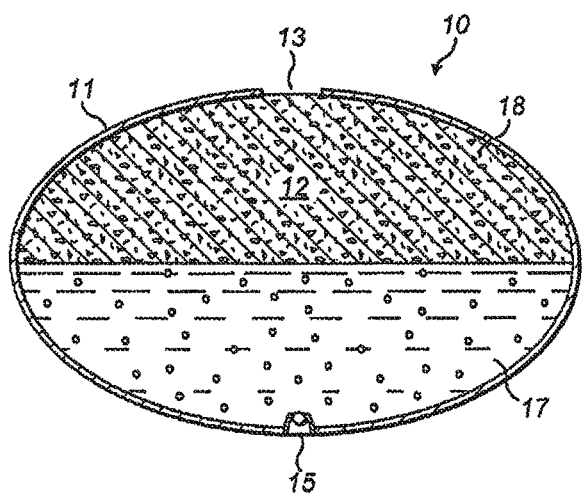
FIG. 7 is a cross sectional side elevation of the package with the foamed product ready for dispensing.

When the food or beverage product is to be consumed, the consumer opens the air inlet means 15 by removing the cover 16 (FIG. 5). The resilient nature of the package 10 causes it to expand to its original shape, sucking air (the secondary ingredient) back in through the air inlet means 15 (FIG. 6) as it does so. The in-rush of air at least partially mixes with the primary ingredient 17. Depending on the nature of the primary ingredient 17 the in-rush of air may be sufficient to effect at least some foaming of the primary ingredient 17. However the consumer may need to shake the package 10 to complete the foaming action. The outlet sealing means 14 is then removed so that the prepared foamed product can be poured or squeezed out through the outlet 13.

The ratio of primary ingredient to air in the chamber 12 varies according to the nature of the primary ingredient and the desired quantity of foamed ingredient. If a typical cappuccino is considered to comprise one third foam, one third espresso and one third milk, for 180 ml of cappuccino around 50-60 ml of foam is expected. For mousse type applications the air to liquid ratio may be around 50:50.

In a modification of the package 10, the air inlet means are provided by the outlet 13. To effect the beverage preparation, the sealing means 14 is removed from the outlet 13 to allow air to enter the chamber 12. Once the package 10 has recovered its normal pre-formed shape the product may be dispensed or sealing means 14 may be reapplied to prevent the product from leaking during shaking.

In a further modified version of this package 10, the air inlet means 15 comprise small apertures or perforations in the wall 11, the perforations being small enough to allow air in, but minimal liquid out.

As a further modification still, an insert may be located inside the package 10 in the form of a mesh web, ball, disc or another device, which assists the foam generation and reduces or eliminates the need for additional shaking. As yet a further alternative a mesh, duct, or suitably shaped nozzle may be provided at the outlet 13 to aid foam generation as the product exits the package 10.

Figure 8:
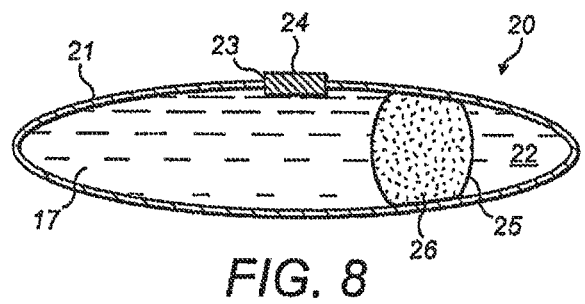
FIG. 8 is a cross sectional side elevation of a filled alternative package to that of FIGS. 1 to 7.
Figure 9:
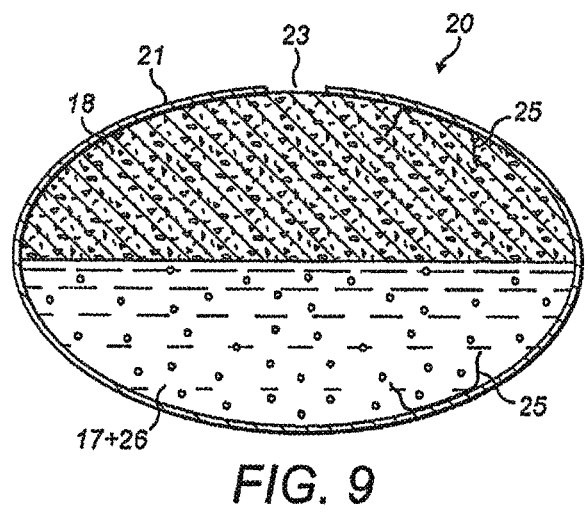
FIG. 9 is a cross sectional side elevation of the package of FIG. 8 with the foamed product ready for dispensing.

A second package 20 is illustrated in FIGS. 8 and 9. This package 20 is made from a suitable resiliently deformable semi-rigid material, such as are described above, which is liquid, and preferably air, impermeable. The walls 21 of the package 20 define a mixing chamber 22 and include an outlet 23 with sealing means 24 for sealing the outlet 23, which may have a similar configuration to that described above.

The package 20 is filled with the primary ingredient 17, and air evacuated. A capsule 25 containing the secondary ingredient 26 is located in the chamber 22. The capsule 25 is made from a relatively frangible material, which is at least liquid impermeable. The capsule 25 is attached to the insides of opposing walls 21 of the package 20. The primary ingredient 17 is therefore unable to mix with the secondary ingredient 26, which is enclosed within the capsule 25.

When the package 20 is opened by removal of the sealing means, air is sucked in via the outlet 23 and the package 20 expanding to its normal position causing the capsule 25 to rupture and release its contents (secondary ingredient 26) to mix with the primary ingredient 17 (FIG. 9). The sealing means 24 may be replaced if shaking of the package is required.

In this, and other versions of the package which include a capsule, the secondary ingredient may be or include a foaming agent (such as those described in US-A-2006/0040038, EP-A-1627572 and EP-A-1627568 or a bubble of compressed gas.

This package 20 may also incorporate similar air inlet means as described in relation to the first package 10 to allow the ingress of air during the product preparation process. This package 20 may also incorporate any of the other modifications described in relation to package 10.

Figure 10:
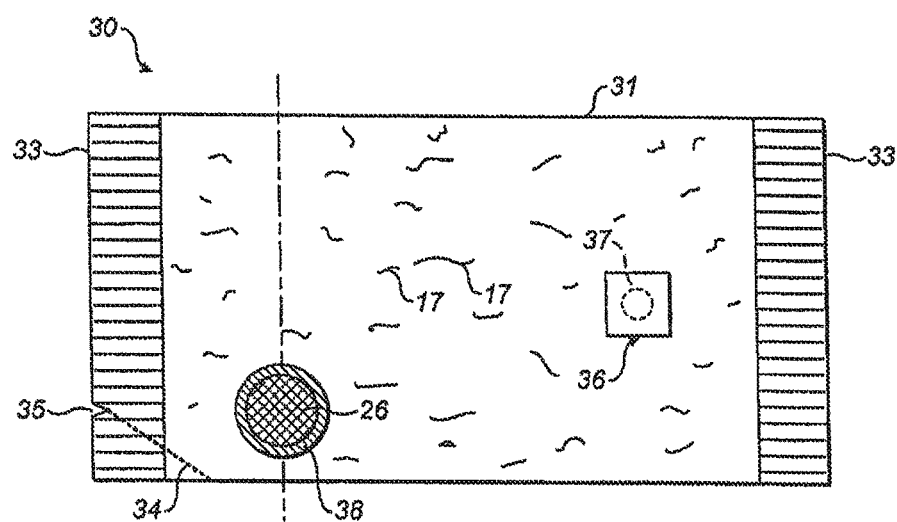
FIG. 10 is a plan view of yet another filled package.
Figure 11:
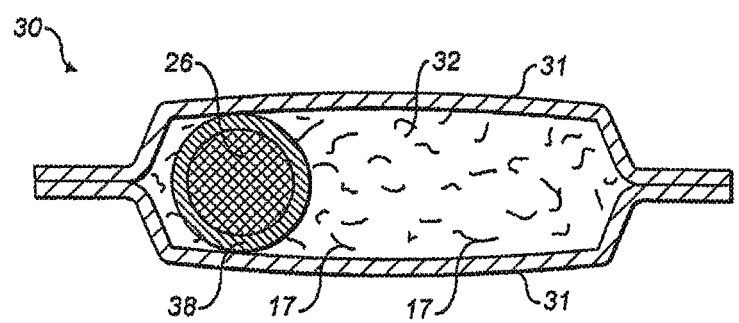
FIG. 11 is a cross sectional end elevation of the package of FIG. 10.
Figure 12:
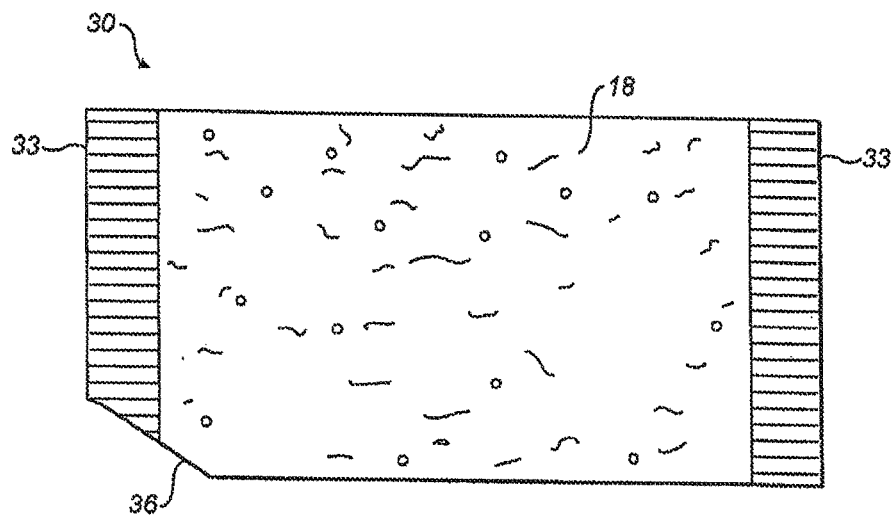
FIG. 12 is a plan view of the package of FIG. 10 with the foamed product ready for dispensing.

A third package 30 is illustrated in FIGS. 10 to 12. This package 30 is preferably made from a flexible material and is not required to be resiliently deformable. The materials described above may be suitable if sufficiently thin to be flexible. The walls 31 of the package 30 again define the mixing chamber 32.

The package 30 may have a preformed outlet as described above. Alternatively, and as illustrated, the walls 31 may be sealed at opposing ends of the package 30 by end seals 33 in one of which is located a line of weakening 34, such as a laser score line, and tear initiation point 35 such as a notch. This enables the package 30 to be torn open in a controlled manner leaving an outlet 37 through which the foamed product can be dispensed.

Air inlet means 36, such as a one-way valve, may be provided in one of the walls 31, preferably at a distance from the outlet 37, to allow the ingress of air into the chamber 32. A removable cover 36a seals the air inlet means 36, which is removed when the product is to be prepared. The removable cover 36a may also be a peelable adhesive foil or label.

Located in the chamber 32 is a capsule 38 which contains the secondary ingredient 26, which may be a foaming agent, compressed air or/gas. The capsule may be unrestrained and therefore able to move freely within the chamber or it may be restrained in a predetermined location. Some air may need to be left in the headspace of the chamber 32 to enable expansion of the foam to take place. In one example the capsule 38 has a volume of 10 to 15 $cm^3$ and the primary ingredient takes up a volume of 50 to 100 $cm^3$ with a preferred headspace of 25 to 50% of the total volume of the package.

The capsule 38 is made from a material which can be broken when the consumer squeezes the capsule 38 (through the package walls 31) between their fingers, thereby bursting the capsule 38. The capsule 38 is at least liquid impermeable and, if the secondary ingredient 26 is gas or air, also gas impermeable. The primary ingredient 17 is therefore unable to mix with the secondary ingredient 26, which is enclosed within the capsule 38.

To prepare the foamed product, the consumer squeezes the capsule 38 within the package 30 until it bursts, releasing the secondary ingredient 26 to mix with the primary ingredient 17 so that the foaming reaction is activated. If the package 30 includes air inlet means 36, this must also be opened to allow air to enter the chamber 32.

The outlet 36 is opened and the foamed product is squeezed out of the outlet 36. Preferably the outlet 36 is designed to provide a narrow and/or torturous path which further aids the generation of foam as the product 18 is dispensed. The outlet 36 may also be provided with an eductor which enables air to be drawn in from the atmosphere and incorporated in the product as it is dispensed.

Figure 13:
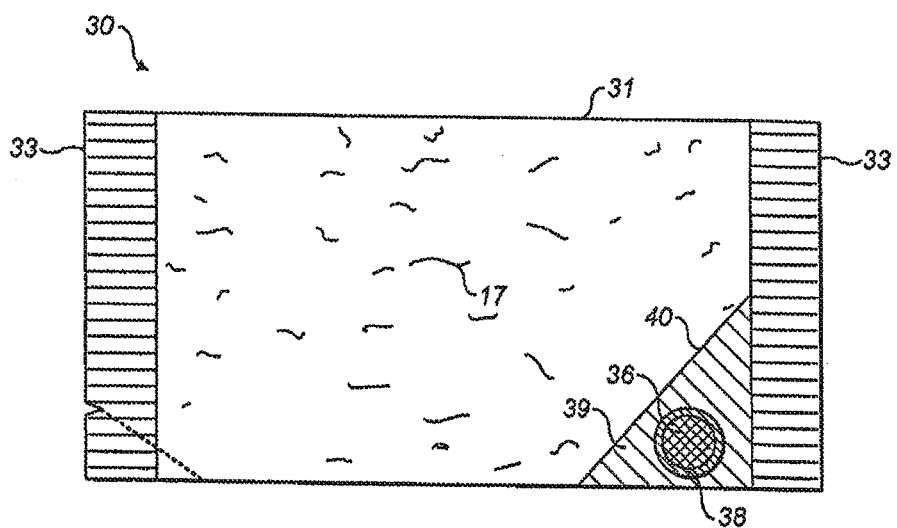
FIG. 13 is a modification of the package of FIG. 10 with the secondary ingredient capsule held in a side chamber.

In a modification of this package 30, shown in FIG. 13, the capsule 38 is restrained in a side chamber 39 formed by creating a weak seal 40 between opposing walls 31 of the package. This makes it easier for the consumer to locate the capsule 38 for bursting. Alternatively the capsule 38 may be restrained in a desired location by a loose fibrous web or other suitable means.

Figure 14:
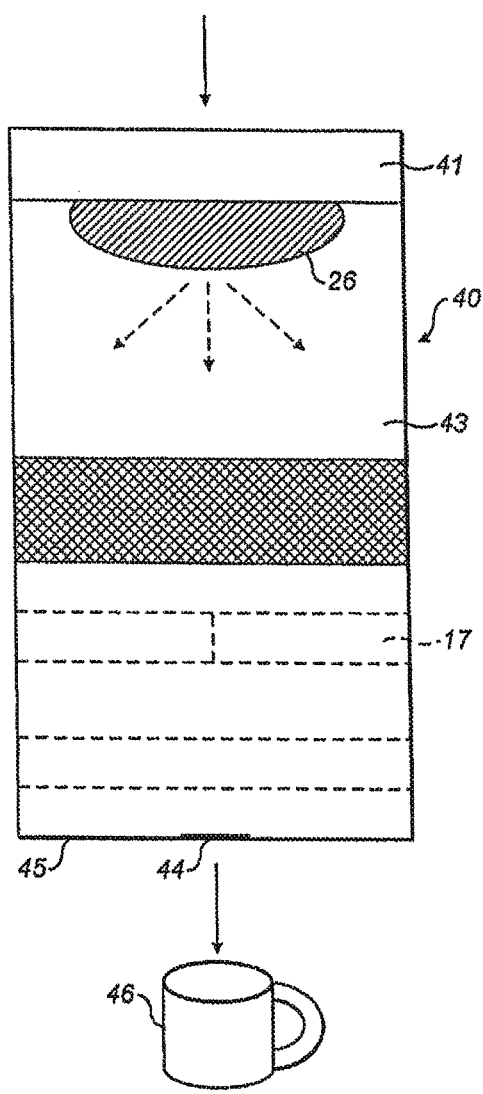
FIG. 14 is a cross sectional front elevation of another package with the foamed product ready for dispensing.

A fourth package 40 is illustrated in FIG. 14. This package 40 incorporates a cap 41 to which is attached the capsule 42 containing the secondary ingredient 26. This is held at the top of the chamber 43, in the bottom of which is the primary ingredient 17.

In order to prepare the product 18 the cap 41 is pushed or squeezed in order to burst the capsule 42 and release the secondary ingredient 26. As the secondary ingredient 26 comes into contact with the primary ingredient 17 foam is generated. Once the foaming reaction has finished, an outlet 44 is opened, in the base 45 of the package 40 to dispense the foamed product into a cup 46 or other receptacle.

A further alternative embodiment of the package has a similar general construction to those described above, and additionally comprises an activatable lever, which is moved by the action of opening the package or removing a layer, to burst the capsule containing the secondary ingredient.

Figure 15:
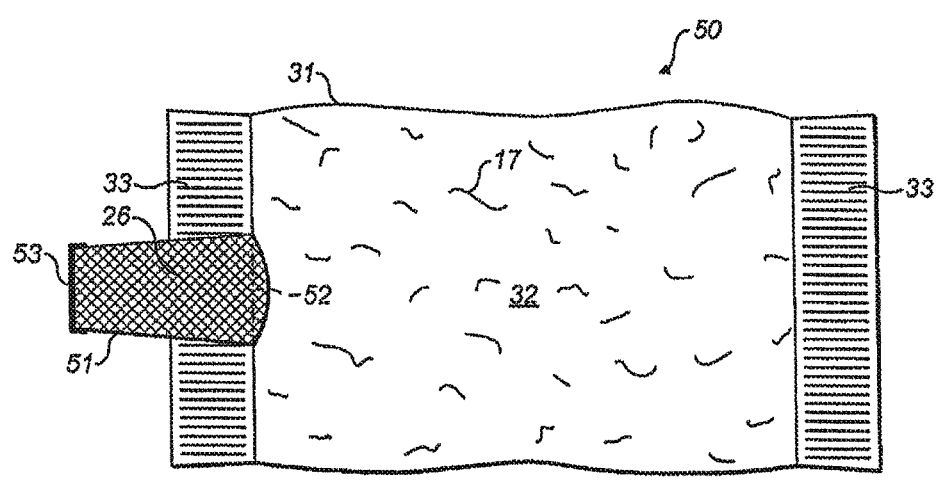
FIG. 15 is a plan view of another filled package.

In yet another version of the package 50, which has a similar general construction to those described above and is shown in FIG. 15, instead of using a capsule located in the mixing chamber 32, the outlet is provided by a nozzle 51 which is filled with the secondary ingredient 26. The nozzle 51 is provided with a closure 53, such as a cap or a removable seal. A breakable barrier 52 such as a membrane, separates the secondary ingredient from the primary ingredient 17 held in the chamber 32. The barrier 52 is broken by squeezing the package 50 to allow the primary and secondary ingredients to mix and the foaming action to take place. The closure 53 is removed from the nozzle 81 and the foamed product is then squeezed out through the nozzle 51. In a further modification the primary and secondary ingredients 17, 26 can be held separate until the point of dispensation so that the primary ingredient only comes into contact with the secondary ingredient as it passes through the nozzle 53.

The invention claimed is:

1. A filled package for the preparation of a foamed beverage or food product from a liquid primary ingredient and air, said package comprising at least one wall defining a chamber containing the primary ingredient, an outlet for dispensing the foamed beverage or the prepared product and an air inlet for selectively enabling the ingress of air into the chamber, wherein the air inlet comprises a one way valve in the at least one wall, wherein the package is resiliently deformable between an initial compressed position in which air is substantially evacuated from the package and an expanded position, such that when the ingress of air is enabled the package recovers from the compressed position to the expanded position sucking air into the chamber thereby mixing with the primary ingredient.

2. The package of claim 1 further comprising a seal for selectively opening and closing the outlet.

3. The package of claim 2 wherein the air inlet comprises a plurality of apertures in the at least one wall of a size which allows the ingress of air into the chamber but substantially prevents the egress of liquid from the chamber.

4. The package of claim 2 further comprising a removable cover for sealing the air inlet.

5. The package of claim 2 wherein the outlet includes the air inlet.

6. The package of claim 2 further comprising a device which assists foam generation.

7. The package of claim 6 wherein the device comprises a mesh web, ball or disc.

8. The package of claim 7 wherein the device is located in the chamber.

9. The package of claim 6 wherein the device is located in the chamber.

10. The package of claim 6 in which the device is located in the outlet.

11. The package of claim 6 in which the device is a nozzle.

12. The package of claim 11 wherein the nozzle is located in the outlet.

13. A method of preparing a foamed beverage or a food product from a filled package as claimed in claim 2, comprising the steps of opening the air inlet to allow the ingress of air into the chamber such that the package expands and sucks air into the chamber, wherein the air mixes with the primary ingredient and effects foaming thereof, opening the outlet and squeezing the package to dispense the foamed beverage or the prepared product via the outlet.

14. A method of manufacturing a package for the preparation of a beverage or a food product from a liquid primary ingredient and air, said package comprising at least one wall defining a chamber for receiving the primary ingredient, an outlet for dispensing the foamed beverage or the prepared product and an air inlet for selectively enabling the ingress of air into the chamber, wherein the air inlet comprises a one way valve in the at least one wall, wherein the package is resiliently deformable between an expanded position and a compressed position, the method comprising the steps of at least partially filling the chamber with a primary ingredient, evacuating air from the chamber by compressing the package such that air escapes from the outlet, and sealing the package.

* * * * *

UNITED STATES PATENT AND TRADEMARK OFFICE
CERTIFICATE OF CORRECTION

PATENT NO. : 9,550,622 B2
APPLICATION NO. : 14/540899
DATED : January 24, 2017
INVENTOR(S) : Kate Avrial Yauk et al.

Page 1 of 1

It is certified that error appears in the above-identified patent and that said Letters Patent is hereby corrected as shown below:

On the Title Page

Column 1, (72) Inventors, Line 4, delete "Conventry (GB);" and insert -- Coventry (GB); --, therefor.

Column 2, Other Publications, Line 2, delete "3 pages." and insert -- 8 pages. --, therefor.

In the Claims

Claim 3, Column 8, Line 5, delete "claim 2" and insert -- claim 1 --, therefor.

Claim 4, Column 8, Line 9, delete "claim 2" and insert -- claim 1 --, therefor.

Claim 5, Column 8, Line 11, delete "claim 2" and insert -- claim 1 --, therefor.

Claim 6, Column 8, Line 13, delete "claim 2" and insert -- claim 1 --, therefor.

Claim 13, Column 8, Line 27, delete "claim 2," and insert -- claim 1, --, therefor.

Signed and Sealed this
Sixth Day of March, 2018

Andrei Iancu
*Director of the United States Patent and Trademark Office*